United States Patent [19]

Canniff

[11] Patent Number: 4,761,751

[45] Date of Patent: Aug. 2, 1988

[54] METHOD AND APPARATUS FOR GENERATING DIGITAL SIGNALS REPRESENTING PERIODIC SAMPLES OF A SINE WAVE

[75] Inventor: Ronald J. Canniff, Naperville, Ill.

[73] Assignee: American Telephone and Telegraph Company AT&T Bell Laboratories, Murray Hill, N.J.

[21] Appl. No.: 891,228

[22] Filed: Jul. 29, 1986

[51] Int. Cl.$^4$ .............................................. G06F 15/31
[52] U.S. Cl. .................................................. 364/721
[58] Field of Search ............... 364/721, 718, 724, 817; 328/14, 142, 178

[56] References Cited

U.S. PATENT DOCUMENTS

| | | | |
|---|---|---|---|
| 3,636,337 | 1/1972 | Dietel et al. | 364/721 |
| 3,649,821 | 3/1972 | Gumacos | 364/721 X |
| 3,679,881 | 7/1972 | Gondeck | 364/721 |
| 4,135,422 | 1/1979 | Chibana | 364/721 X |
| 4,159,526 | 6/1979 | Mosley, Jr. et al. | 364/721 |
| 4,285,044 | 8/1981 | Thomas et al. | 364/721 |
| 4,577,287 | 3/1986 | Chrin | 364/721 |
| 4,618,966 | 10/1986 | Stepp et al. | 364/721 X |

OTHER PUBLICATIONS

Gold et al., "Digital Processing of Signals", McGraw-Hill, 1969, pp. 146-149.
Tierney et al., "A Digital Frequency Synthesizer", IEEE Transactions on Audio and Electroacoustics, vol. AU-19, No. 1, Mar. 1971, pp. 48-56.
Rabiner et al., "Theory and Application of Digital Signal Processing", Prentice-Hall, 1975, pp. 563-565.
McAuliffe, "Digital Sample Oscillator", IBM Tech Disclosure Bulletin, vol. 15, No. 4, Sep. 1972, pp. 1126-1127.

Primary Examiner—Gary V. Harkcom
Assistant Examiner—Tan V. Mai
Attorney, Agent, or Firm—Werner Ulrich

[57] ABSTRACT

A method and apparatus for generating accurate digital representations of one or more sine waves. A digital signal processor is used to generate the sample digital values, spaced at period T, of a sine wave of frequency F, F<1/2T, using recursive methods. The magnitude of the generated sample values is stabilized and controlled by normalizing the recursively generated samples from time to time, but not necessarily after each recursive calculation. Methods are described for generating values based on the values of two previously generated samples using the recursion formula: $y(n) = y(n-1)2 \cos\omega - y(n-2)$ where $\omega = 2\pi FT$ and $y(n)$, $y(n-1)$ and $y(n-2)$ represent three consecutive sample values. The normalizing factor, used for multiplying a recursively generated sample value to stabilize the amplitude, associated with this calculation is $$N = 1.5 - [y^2(n-1) + y^2(n-2) - 2\cos\omega(y(n-1))y(n-2)] \frac{1}{2(A\sin\omega)^2},$$

where A is the desired amplitude. Methods are also described for generating two sine waves of the same frequency but displaced in phase, and for generating frequency and phase-shift keyed sine waves. Advantageously, these methods and apparatus minimize the resources required for performing the generation of the sine waves.

34 Claims, 6 Drawing Sheets

METHOD AND APPARATUS FOR GENERATING DIGITAL SIGNALS REPRESENTING PERIODIC SAMPLES OF A SINE WAVE

TECHNICAL FIELD

This invention relates to digital signal processing and, more specifically, to the digital generation of sine wave signals.

BACKGROUND OF THE INVENTION

Heretofore, sine waves have been generated with digital circuitry either by direct read-out of values stored in a memory unit or by a digital signal processor generating the sequential values of the sine wave using a recursive process. One known method calculates successive samples of a pair of orthogonal sine waves (i.e., a sine wave and a cosine wave) by means of recursion equations. Each successive value, y(n) and z(n) of the sine and cosine wave can be calculated from the previous values, y(n−1) and z(n−1), using the well-known trigonometric formulae:

$$y(n) = y(n-1)\cos\omega + z(n-1)\sin\omega \quad (1)$$

$$z(n) = z(n-1)\cos\omega - y(n-1)\sin\omega \quad (2)$$

where $\omega = 2\pi FT$, T is the interval between successive samples and F is the frequency of the sine wave. The calculating procedure suffers from the accumulation of round-off errors leading to the generation of an exponentially increasing or decreasing sine wave.

U.S. Pat. No. 4,285,044, L. Thomas et al., issued Aug. 18, 1981, proposed that round-off error accumulation could be moderated by the use of rather elaborate circuitry for calculating the quantity $$1 + \frac{1 - z^2(n) - y^2(n)}{2}$$

and using the calculated quantity as an approximation for a normalization factor to be applied to calculated sample values to ensure that the value of the $z^2(n) + y^2(n)$ calculated from sample values of the sine and cosine waves would initially converge to 1 and subsequently remain at approximately 1. The Thomas patent normalizing factor circuitry prevents exponential build up or exponential decay of the calculated values of the sine and cosine waves. A less complex arrangement for avoiding the exponential build up or decay problem in a system for generating successive sample values of a sine wave in digital format would clearly be attractive. It would also be advantageous to permit a given digital signal processor system to generate the sample values for more sine waves or generate more frequent samples of a sine wave and thereby achieve a more perfect output wave when an analog sine wave is generated by a digital to analog converter and a filter at the output of that converter is not perfect.

U.S. Pat. No. 4,577,287 by C. Chrin, issued Mar. 18, 1986, proposed that roundoff error accumulation could be moderated by the use of circuitry or calculations which limit the magnitudes of calculated values of sine and cosine to one. Initial constants would be rounded up so that successive calculated values would tend to build up exponentially very slowly and be limited by the limiting step. By biasing the initial constants exponential decay is avoided. However, the solution proposed by Chrin suffers from the fact that a large number of calculating steps are required for calculating each sample, and that, for many frequencies, the amplitude of the desired output varies by several percent over an extended interval of time.

A problem of the prior art is therefore that the number of computation steps for computing successive values of samples of a sine wave is high and that the amount of computation for stabilizing the magnitude of such samples is high.

SUMMARY OF THE INVENTION

These problems are solved and an advance is made in the art through a process of calculating digital values of consecutive samples spaced at intervals of T, of a sine wave of frequency F, amplitude A, where $F < 1/2T$, using the formula $y(n) = 2\cos\omega(y(n-1)) - y(n-2)$, where y(n), y(n−1), and y(n−2) represent the most recently calculated sample value of the sine wave and the two immediately preceding sample values and $\omega = 2\pi FT$; using this basic formula, exponential build up can be prevented by periodically adjusting or normalizing the values of the samples by multiplying them by a normalizing factor N, where $$N = 1.5 - [y^2(n-1) + y^2(n-2) - 2\cos\omega(y(n-1))y(n-2)]\frac{1}{2(A\sin\omega)^2},$$

where the period for adjusting need not be exact and may be different from the sampling period. Advantageously, such an approach substantially reduces the amount of calculation required for generating successive samples of a sine wave, prior to normalization.

In accordance with one embodiment of the invention, the calculations are performed by a signal processor operating under program control. Advantageously, such a signal processor can be time-shared to calculate sine wave sample amplitudes for a number of frequencies concurrently.

In accordance with one aspect of the invention, normalization is not performed with each sample value calculation. Advantageously, this sharply reduces the total time required to perform sample value calculations.

In a system in accordance with this invention, initial values of two samples of sine signal amplitudes are needed. In accordance with one embodiment of this invention, these initial values are set to 0 and $-A\sin\omega$, where A is the magnitude of the desired sine wave; this choice causes sample values for a sine wave of amplitude A to be generated. Advantageously, this choice reduces the time required for performing calculations of sample values since no scaling is required to generate sample values of the correct amplitude.

In one embodiment of the invention, a digital signal processor capable of generating digital amplitudes of sample values of several sine waves at the same time is employed since the required data processing load for generating each sample is sufficiently small that samples for several sine waves may be generated in one interval T. Advantageously, in a system requiring the concurrent generation of a plurality of sine waves, fewer digital signal processors are required to carry out this function using this invention since fewer calculations are required.

In accordance with one aspect of the invention, the output of a digital signal processor is transmitted to one or more digital to analog converters whose outputs when filtered are sinusoidally varying electrical signals. Advantageously, this is a low cost apparatus for generating one or more high quality sine waves.

In accordance with one specific embodiment of this invention, if digital sine waves of only a limited number of frequencies are required of a digital signal processor, the constants $2\cos\omega$ and $\sin\omega$ or, alternatively, $2\cos\omega$ and a scaling factor of $(A\sin\omega)(2^{-0.5})$, where A is the desired amplitude of the output sine wave, can be pre-calculated and stored in memory for each frequency.

In accordance with another aspect of the invention, the formula based on equations (1) and (2) is used for generating sample values, and the adjustment calculation is performed much less frequently than the basic sample value calculation. Advantageously, this approach reduces the computation resources required to calculate the normalized sample values.

In accordance with another aspect of the invention, digital signals representing samples of a frequency shift keyed or phase shift keyed sine wave are efficiently generated using generating formulas (1) and (2) as the basis. Advantageously, this method can be combined with the less frequent normalization calculation.

In accordance with another aspect of the invention, two sine waves offset in phase by $\phi$ can be generated using the following formulas, where y(n) and z(n) represent the n'th sample of the two sine waves:

$$y(n) = ay(n-1) + bz(n-1) \quad (3)$$

$$z(n) = cz(n-1) - by(n-1) \quad (4)$$

where:

$$a = \cos\omega - \sin\omega \frac{\cos\phi}{\sin\phi} \quad (5)$$

$$b = \frac{\sin\omega}{\sin\phi} \quad (6)$$

$$c = \cos\omega + \sin\omega \frac{\cos\phi}{\sin\phi} \quad (7)$$

Advantageously, normalization need not be performed with each calculation.

BRIEF DESCRIPTION OF THE DRAWING

A more complete understanding of the present invention may be obtained from a consideration of the following description when read in conjunction with the drawing, in which.

DETAILED DESCRIPTION

Figure 1:
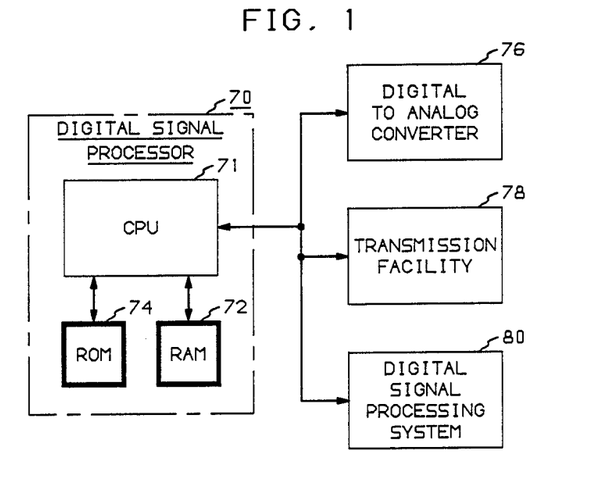
FIG. 1 is a block diagram of the apparatus used for generating and utilizing successive sample values of a sine wave.

FIG. 1 shows a digital signal processor 70 including central processing unit 71, random access read/write memory 72, and read-only memory 74. The signal processor may be a unit such as the commercially available WE ® DSP32 manufactured by AT&T Technologies, Inc. Where a particular application requires the generation of only a limited number of possible digital sine waves, for example, a transceiver for transmitting telephone data in the form of a pair of selected tones, which requires that between 6 and 100 different frequencies need to be generated, the values of $2\cos\omega$ and $\sin\omega$ for these frequencies can advantageously be stored in read-only memory 74 or can be loaded as necessary from another processor or data link (not shown) into the writable memory 74. From the values of these constants, other initialization constants, discussed below, can be readily calculated. Read-only memory 74 or memory 72 is also used for storing the program for generating the digital sine waves of the invention. Blocks 72 and 74 are shown with heavy shading to emphasize that the novelty of the present invention is in the contents of these blocks. The digital output signals provided by digital signal processor 70 are applied to digital to analog converter 76 which generates an analog sine wave signal from the digital sine wave. In addition, the output of signal processor 70 may be delivered to transmission facility 78 for utilization by remote user device (not shown).

Figure 2:
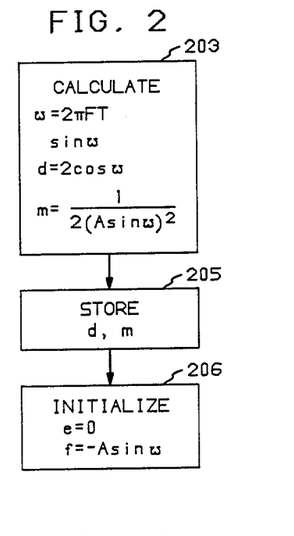
FIGS. 2-4 are flow charts of programs for initializing memory, calculating sample values, and normalizing sample values of a sine wave.
Figure 3:
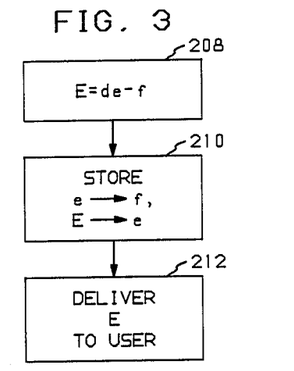
Figure 4:
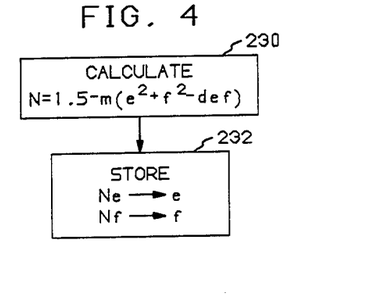
Figure 5:
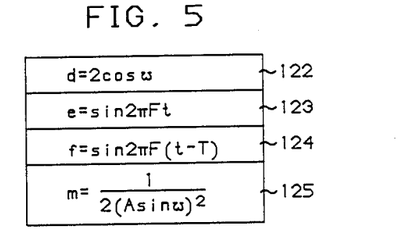
FIG. 5 is a memory layout for storing initialization constants and intermediate sample values.

The program for controlling the generation of successive samples of a sine wave as described herein is computationally more efficient than other programs which have been implemented in the past for generating successive samples of a stable high precision sine wave in digital form. FIGS. 2-4 are flows chart of programs for generating successive sample values in digital form of a sine wave. Memory slots 121-125 (FIG. 5) are used for storing temporary data.

The basic formula for deriving successive sample values is:

$$y(n) = y(n-1)2\cos\omega - y(n-2).$$

This formula can be derived from equations (1) and (2) as follows. Extending equations (1) and (2) gives:

$$y(n-1) = y(n-2)\cos\omega + z(n-2)\sin\omega \quad (8)$$

and $$z(n-1) = z(n-2)\cos\omega - y(n-2)\sin\omega \quad (9)$$

Substituting the value of z(n−1) of equation (9) into equation (1): 4

$$y(n) = y(n-1)\cos\omega + [z(n-2)\cos 107 - y(n-2)\sin\omega]$$
$$\sin\omega = y(n-1)\cos\omega - y(n-2)\sin^2\omega + z(n-2)\cos\omega\sin\omega \quad (10)$$

From equation (8), $$zg(n-2)\sin\omega = y(n-1) - y(n-2)\cos\omega \quad (11)$$

Substituting this into equation (10):

$$y(n) = y(n-1)\cos\omega - \quad (12)$$

$$y(n-2)\sin^2\omega + [y(n-1) - y(n-2)\cos\omega]\cos\omega$$

-continued $$y(n) = y(n-1)2\cos\omega - [y(n-2)(\sin^2\omega + \cos^2\omega)]$$

$$y(n) = y(n-1)2\cos\omega - y(n-2).$$

FIG. 2 is a flow chart of a program for initializing the processor for subsequent iterative calculations. In block 203 the initialization constants are calculated. The constant $d = 2\cos\omega$ is required in the iterative loop for calculating the next sample value of a sine wave given the two previous values and in the normalization calculation of FIG. 4. The constant $\sin\omega$ is required to calculate magnitude dependent factors. The factor $-A\sin\omega$ is subsequently used as the initial value of $y(n-2)$; if the initial values are $y(n-1)=0$ and $y(n2)=-A\sin\omega$, then a sample value for a sine wave of amplitude A will be generated. By using $-A\sin\omega$ an initially rising sine wave is generated; alternatively, by using an initial value of $A\sin\omega$, an initially decreasing sine wave is generated. The factor $$m = \frac{1}{2(A\sin\omega)^2}$$

is also calculated and is used for normalization. In block 205 the values of d and m are stored in locations 122 and 125. In block 206, initial values of two previous samples of the sine wave, e and f, are set at 0 and $-A\sin\omega$ and stored in locations 123 and 124.

FIG. 3 is the program for generating one sample value of a sine wave. This program is executed once every T seconds. Step 208 shows the calculation of the next sample value E from the two previous sample values e and f and the frequency constant d. The formula for making this calculation is $E = de - f$. In step 210, the previous value of e (location 123) is stored in f (location 124) and the value of E is stored in e (location 123) to prepare for the next iteration. In step 212 the value E is delivered to a user such as digital to analog converter 76, transmission facility 78, or digital processing system 80.

A normalization calculation (FIG. 4) is carried out much less frequently than the sample sine wave calculation. Since the basic sample calculation is approximately correct, buildup or decay is very slow so that a normalization calculation carried out every 0.1 seconds for T = 125 microseconds (i.e., once for every 800 samples), for example, is adequate to generate samples for a high quality sine wave generated by a precision signal processor. In any particular application, the required magnitude accuracy and the arithmetic precision of the signal processor will limit the length of the normalization interval. N is calculated by the formula $N = 1.5 - m(e^2 + f^2 - def)$. The value N is then used to multiply the present value of e to produce a new value of e and is used to multiply the present value of f to produce a new value of f. These normalized values are stored in step 232.

Figure 6:
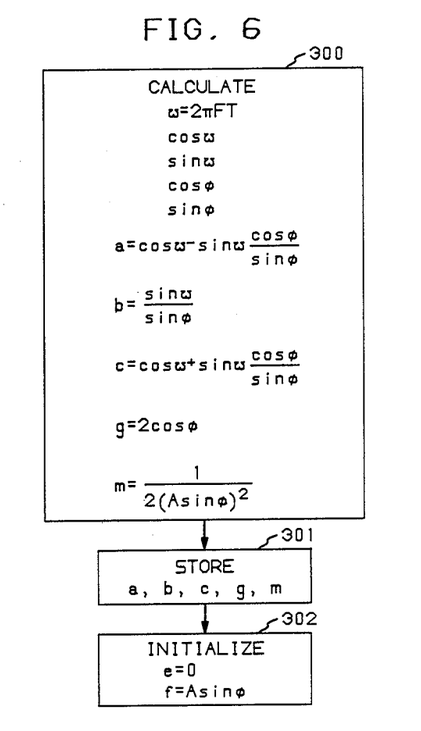
FIGS. 6-8, 9-11, 12-13, and 14-16 are flow charts for generating digital samples of a pair of sine waves offset in phase by $\phi$, a frequency shift keyed sine wave, a phase shift keyed sine wave, and for an alternative method of generating digital samples of a sine wave, respectively.
Figure 7:
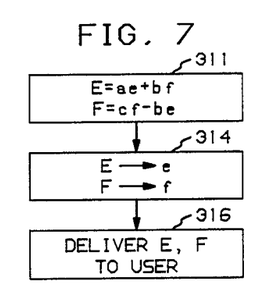
Figure 8:
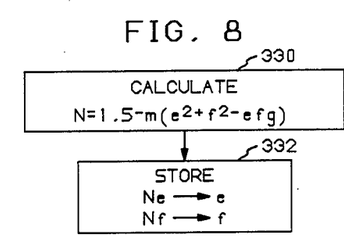

An alternative method of generating the digital sample values of a sine wave is shown illustratively in FIGS. 6–8. This method is particularly appropriate when two sine waves of the same frequency but displaced by an arbitrary phase $\phi$ are required by a user. The equations associated with this method are equations (3) and (4) below:

$$y(n) = ay(n-1) + bz(n-1) \quad (3)$$

$$z(n) = cz(n-1) - by(n-1) \quad (4)$$

If y(n) represents a sample of the first sine wave and z(n) represents a sample of the second sine wave, displaced by phase $\phi$ from the first sine wave, then if a, b, c and d have the values given by equations (5)–(7), below, wherein $\omega 2\pi FT$, (also shown in block 300 of FIG. 6) and if $y(n-1)$ and $z(n-1)$ represent the previous sample values of the first and second sine waves, respectively, equations (3) and (4) can be used recursively to generate the desired sine waves.

$$a = \cos\omega - \sin\omega \frac{\cos\phi}{\sin\phi} \quad (5)$$

$$b = \frac{\sin\omega}{\sin\phi} \quad (6)$$

$$c = \cos\omega + \sin\omega \frac{\cos\phi}{\sin\phi} \quad (7)$$

FIG. 6 shows how the system is initialized to generate these sine waves of amplitude A. First (block 300) the four basic constants $\cos\omega$, $\sin\omega$, $\cos\phi$, $\sin\phi$ are generated. Next, a, b, and c are generated from these four values. Next, the value of $g = 2\cos\phi$ is calculated, for later use in the normalization calculations. Finally, the value of m, $$m = \frac{1}{2(A\sin\phi)^2},$$

used in subsequent normalization calculations is calculated. The values of a, b, c, g and m are stored (action box 301) and the initial value of the first sine wave, e, is set to 0, and the initial value of the second sine wave, f, is set to $A\sin\phi$ (action box 302).

FIG. 7 illustrates the calculation performed every T seconds in order to generate the sample values E and F of the two sine waves. In action box 311, the values of E and F are calculated using equations (3) and (4). E and F are stored in the locations set aside for storing e and f to prepare for the next calculation of the values of the two sine waves (action box 314). Finally, E and F are delivered to the user of these sample values of the sine waves (action box 316).

FIG. 8 illustrates the normalization function and is similar to FIG. 4. However, in FIG. 8 the formula for N is $N = 1.5 - m(e^2 + f^2 - efg)$, wherein $g = 2\cos\phi$ (action box 330). This value of N is then used to normalize the previously calculated values of e and f so that exponential build up or decay of the sample values of the sine waves is prevented.

Figure 9:
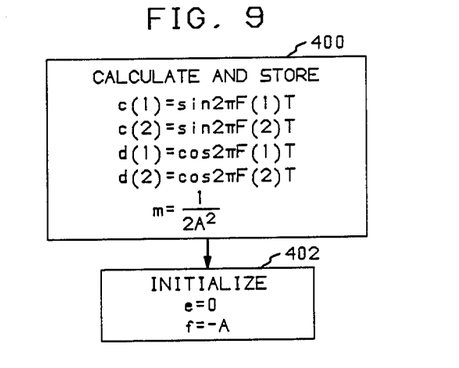
Figure 10:
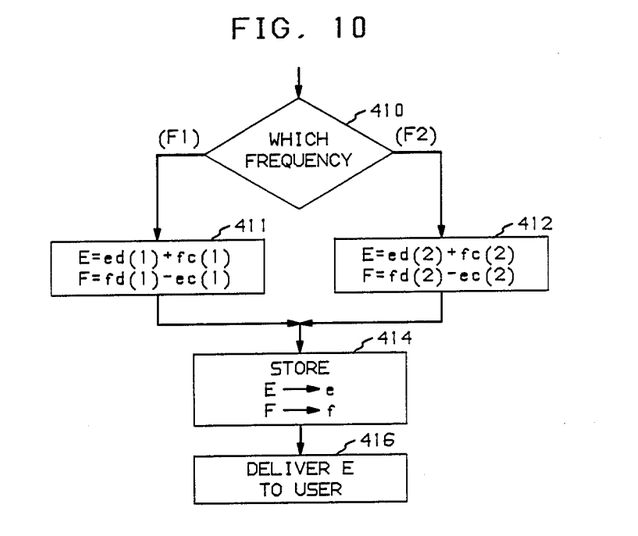
Figure 11:
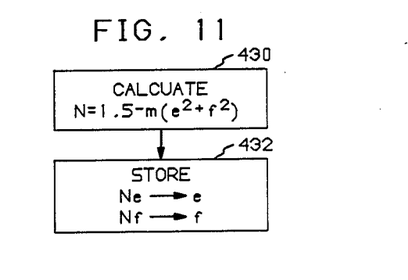
Figure 12:
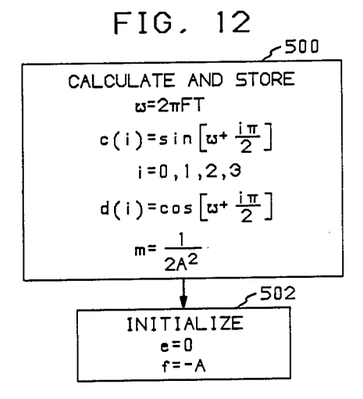
Figure 13:
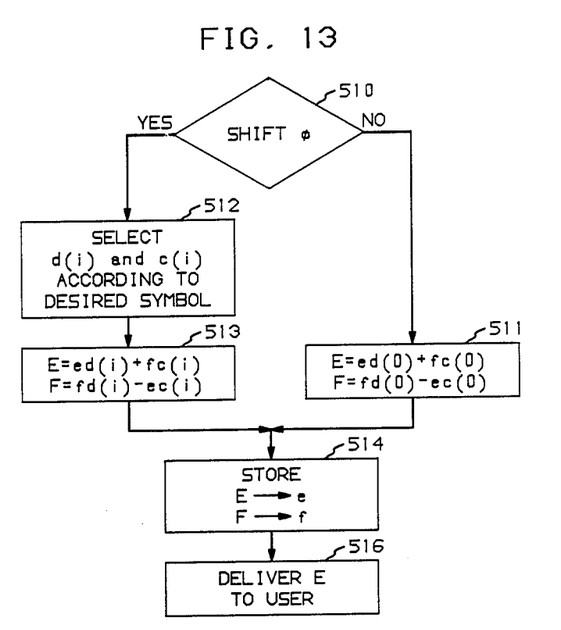

The principles of the invention can also be used for generating sample values of a sine wave which is modulated by either frequency or phase shift keying. FIGS. 9–11 illustrate frequency shift keying and FIGS. 12, 13, and 11 illustrate phase shift keying. In these illustrative examples, two frequencies F(1) and F(2) are used, and four values of phase shift (corresponding to i=0, 1, 2, and 3) are used for phase shift keying. Clearly other values of the number of frequencies or the number of possible phase shifts could also be used.

FIG. 9 shows the initialization required for frequency shift keying. Values of c(1) and d(1) representing sin $2\pi F(1)T$ and cos $2\pi F(1)T$ are calculated for generating successive samples of a srne wave of frequency F(1).

Similarly, values of c(2) and d(2), representing sin $2\pi F(2)T$, and cos $2\pi F(2)T$, are calculated for generating samples for a sine wave of frequency F(2).

$$m = \frac{1}{2A^2}$$

is also calculated and used as described with respect to FIG. 11. The sine wave, e, is initialized to 0 and the cosine wave, f, is initialized to $-A$, where A is the amplitude of the desired sine waves.

FIG. 10 illustrates the generation of a frequency shifted sine wave. Decision block 410 tests which frequency is being generated. If frequency F(1) is generated (action box 411), then c(1) and d(1) are used to calculate the next values of the sine and cosine waves; if frequency F(2) is to be generated (action box 412), then c(2) and d(2) are used in the calculations of the values of the next sample of the sine and cosine waves. These values E and F are then substituted for the previous values e and f (action box 414) and the value of E is delivered to a user (action box 416). The equations used in boxes 411 and 412 (and 511 and 513) are equations (1) and (2), where E and F represent y(n) and z(n) and e and f represent y(n−1) and z(n−1).

The normalization factor $N = 1.5 - m(e^2 + f^2)$ is calculated (action box 430, FIG. 11). Note that this is equivalent to the value of N in action box 330 (FIG. 8) for the special case $\phi = \pi/2$ radians, wherein cos $\phi = 0$. The normalization is then performed (action block 432) and the normalized results stored in the locations of the most recently calculated sample. Because the normalization calculation (430) is frequency independent and the amplitude is fixed, the frequency shift causes no perturbation to the normalization operation. That is, N is correcting only for very small errors (drift) even in the presence of the frequency shift, and thus infrequent normalization operations are possible. This comment also applies to the phase shift keying normalization.

FIG. 12 illustrates initialization necessary to generate phase shift modulated sine wave. In this example, four different values of phase shift may be introduced at the point where the modulation takes place. These four values are zero, 90 degrees, 180 degrees, or 270 degrees corresponding to 0, $\pi/2$, $\pi$, and $3\pi/2$ radians. The four values of sine and four values of cosine constants necessary for introducing phase shift, including the constants required for introducing no phase shift, are calculated (action block 500). These eight constants are referred to as c(i) and d(i), where i varies for 0 to 3, for the sine value and the cosine value, respectively. m is also calculated for reasons discussed with respect to FIGS. 8 and 11. Finally, e is initialized to 0 representing the initial value of the sine wave and f is initialized to A representing the initial value of the corresponding cosine wave (action block 502).

FIG. 13 illustrates the process of introducing phase shift into the calculated values of sine and cosine. Decision block 510 checks whether a phase shift is required. If not, then action box 511 calculates the new values of E and F in essentially the same way as these values are calculated in action box 411, previously discussed with respect to FIG. 10. If a phase shift is required then the proper values of c(i) and d(i) are selected according to the value of the desired symbol to introduce the appropriate phase shift (action box 512). The selected values c(i) and d(i) are then used to calculate the next value of the sine wave and the corresponding cosine wave (action box 513). The next values of sine and cosine wave are then stored to replace the previous values (action box 514) and the value E is delivered to the user (action box 516). The normalization technique illustrated in FIG. 11 is used with respect to either the frequency shift or the phase shift generated signals. Again, infrequent normalization is entirely appropriate.

Figure 14:
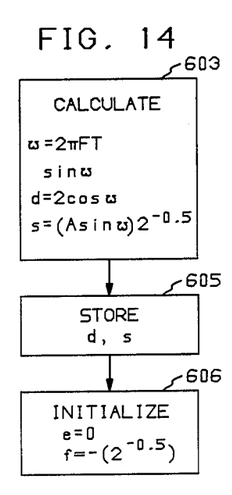
Figure 15:
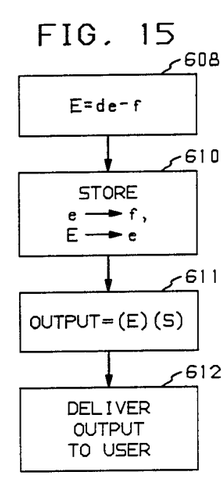
Figure 16:
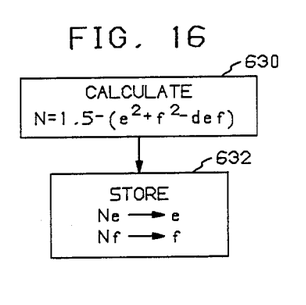

An alternative arrangement for calculating digital sample values for a sine wave is shown in FIGS. 14–16. These figures are similar to FIGS. 2–4 with certain exceptions. The numbering of the blocks has been increased by 400 from the numbers of the comparable blocks in FIGS. 2–4. Block 603 is similar to block 203 except that instead of calculating an initial value of f and calculating a value of m, a scaling factor, S, is calculated. This scaling factor, used as described below in block 611, is the product of the desired amplitude, A, c (the value of sin $\omega$), and 2 to the power $-0.5$ (one-half of the square root of 2). In block 605, the values of d and S are stored and in block 606, the initial value of f is set to $-(2^{-0.5})$. FIG. 15 shows the calculation of one sample of the sine wave in block 608, 610, 611, and 612. Blocks 608 and 610 are the same as blocks 208 and 210 of FIG. 3. Block 611 shows that an output is calculated which is the product of E and S, the scaling factor. In block 612, this output is delivered to the user. FIG. 16 is similar to FIG. 4 except that the equivalent of the factor m is one and there is no need to multiply $e^2$, $f^2$ and def by this factor.

The alternative embodiment permits a sine wave to be calculated from stored constants using only two stored constants, namely, the values of S, the scaling factor, and d, 2 cos $\omega$. It is not necessary to store the value of sin $\omega$ and A since the critical product of these two values is stored in the value S. The actual calculation of a sample value requires the extra step represented by block 611 of generating an output from the value of E by multiplying this value by the scaling factor, S. The normalizing calculation has been simplified through avoidance of multiplying $e^2$, $f^2$ and def by the factor m.

It is to be understood that the above-described embodiments are merely illustrative of the principles of this invention; other arrangements may be devised by those skilled in the art without departing from the spirit and scope of the invention.

What is claimed is:

1. A method of generating electrical digital signals representing periodic sample values for a sine wave, the period of sample generation being T seconds, the frequency of said sine wave being F, T being less than 1/2F, wherein $\omega = 2\pi FT$, comprising the steps of:
   (a) generating electrical signals representing the value of d, $d = 2 \cos \omega$;
   (b) generating electrical signals representing an initial value e of the value of said sine wave for time $t = T$ and an initial value f of the value of the sine wave for time $t = 0$;
   (c) generating a next value E of said sine wave by calculating $E = de - f$;
   (d) replacing f by e and e by E;
   (e) transmitting an electrical signal representing the value E to a user of said signal;
   (f) repeating steps (c), (d), and (e) every T seconds for the duration of the time of generation of said digital sine wave;

(g) calculating a normalizing factor N based on the values of d, e, and f;
(h) multiplying e and f by said normalizing factor; and
(j) repeating steps (g) and (h) every U seconds for the duration of the time of generation of said digital sine wave, where $U \geq T$.

2. The method of claim 1 wherein $U \geq 10T$.

3. The method of claim 1 wherein step (b) comprises the step of setting $e=0$ and setting f to one of $\pm A \sin \omega$ where A is the desired amplitude of said sine wave, further comprising the step of calculating $$m = \frac{1}{2(A\sin\omega)^2},$$

and wherein step (g) comprises the step of calculating $N = 1.5 + m(def - e^2 - f^2)$.

4. The method of claim 3 wherein $U\Delta 10T$.

5. The method of claim 1 in which step (a) comprises the steps of:
storing a group of k initial values of $d(i) = 2 \cos 2\omega F(i)T$ for k values of $F(i)$, i representing an integer between 1 and k; and
selecting d(a) in response to a request from a user for a sine wave of frequency F(a) where a is an integer between 1 and k.

6. A method of generating an electrical signal representing a sine wave, the frequency of said sine wave being F, T being a period of time less than 1/2F, wherein $\omega = 2\pi FT$, comprising the steps of:
(a) generating electrical signals representing the value of d, $d = 2 \cos \omega$;
(b) generating electrical signals representing an initial value e of the value of said sine wave for time $t=T$ and an initial value f of the value sine wave for time $t=0$;
(c) generating a next value E of said sine wave by calculating $E = De - f$;
(d) replacing f by e and e by E;
(e) transmitting an electrical signal representing the value of E to a digital to analog converter connected to a filter having an output, wherein the output of said filter is said electrical signal representing said sine wave;
(f) repeating steps (c), (d), and (e) every T seconds for the duration of the time of generation of said digital sine wave;
(g) calculating a normalizing factor N based on the values of d, e, and f;
(h) multiplying e and f by said normalizing factor; and
(i) repeating steps (g) and (h) every U seconds for the duration of the time of generation of said digital sine wave, where $U \geq T$.

7. The method of claim 6 wherein $U \geq 10T$.

8. The method of claim 6 wherein step (b) comprises the step of setting $e=0$ and setting f to one of $\pm A \sin \omega$ where A is the desired amplitude of said sine wave, further comprising the step of calculating $$m = \frac{1}{2(A\sin\omega)^2},$$

and wherein step (g) comprises the step of calculating $N = 1.5 + m(def - e^2 - f^2)$.

9. A digital sine wave oscillator for generating a signal representing the consecutive periodic sample digital values of a sine wave of frequency F, the period between consecutive sample values being T seconds where $T < 1/2F$ comprising:
digital signal processing means operative under program control for deriving initial values $d = 2 \cos \omega$ and an initial value e of the value of a wave for time $t=T$ and an initial value f of the value of the sine wave for time $t=0$;
for calculating every T seconds, a next value E of said sine wave by calculating $E = de - f$ and by substituting the values of E and e for the values of e and f, respectively, prior to the next calculation of E; and
for normalizing, every U seconds, the calculated sample values by multiplying e and f, by a normalizing factor N based on the current values of e and f, wherein $U \geq T$.

10. The digital sine wave oscillator of claim 9 wherein $U \geq 10T$.

11. The digital sine wave oscillator of claim 9 wherein said digital signal processing means is further operative under program control for setting the initial value of $e=0$ and for setting the initial value of f to one of $+A\sin \omega$, where A is the desired amplitude of the sine wave.

12. The digital sine wave oscillator of claim 11 wherein said normalizing factor $$N = 1.5 + \frac{(def - e^2 - f^2)}{2(A\sin\omega)^2}.$$

13. The digital sine wave oscillator of claim 9 wherein said digital signal processing means stores a group of k initial values of $d(i) = \cos 2\pi F(i)T$ for k values of F(i), i representing an integer between 1 and k, and said digital signal processor is further operative under program control for selecting d(a) in response to a request from a user for a sine wave of frequency F(a) wherein a is an integer between 1 and k.

14. A method of generating electrical digital signals representing periodic sample values for a sine wave, the period of sample generation being T seconds, the frequency of said sine wave being F, T being less than 1/2F comprising the steps of:
(a) generating electrical signals representing an initial value e of the valule of said sine wave for time $t=0$;
(b) generating a next value E of said sine wave from said value of e;
(c) replacing e by E;
(d) transmitting an electrical signal representing the value of E to a user of said signal;
(e) repeating steps (b), (c), and (d) every T seconds for the duration of the time of generation of said digital sine wave;
(f) calculating a normalizing factor N based on the value of e;
(g) multiplying e by said normalizing factor; and
(h) repeating steps (g) and (h) every U seconds for the duration of the time of generation of said digital sine wave, wherein $U > T$.

15. The method of claim 14 wherein $U \geq 10T$.

16. A digital sine wave oscillator for generating a signal representing the consecutive periodic sample digital values of a sine wave of frequency F, the period between consecutive sample values being T seconds where $T < 1/2F$ comprising:
digital signal processing means operative under program control for deriving an initial value e of the value of a sine wave for time $t=0$;

for calculating every T seconds, a next value E of said sine wave and for substituting the value of E for the value of e prior to the next calculation of E; and for normalizing, every U seconds, the calculated sample values by multiplying e by a normalizing factor ZN based on the current value of e, wherein $U > T$.

17. The digital sine wave oscillator of claim 16 wherein $U < 10T$.

18. A method of generating electrical digital signals representing periodic sample values for a first and a second sine wave of same frequency, displaced in phase by $\phi$ radians, the period of sample generation being T seconds, the frequency of sine wave being F, T being less than $1/2F$, wherein $\omega = 2\pi FT$, comprising the steps of:

(a) generating electrical signals representing the values of a, b, and c where $$a = \cos\omega - \sin\omega \frac{\cos\phi}{\sin\phi},$$

$$b = \frac{\sin\omega}{\sin\phi},$$

$$c = \cos\omega + \sin\omega \frac{\cos\phi}{\sin\phi},$$

(b) generating electrical signals representing an initial value e of the value of said first sine wave for time $t=0$, and an initial value f of the said second sine wave for time $t=0$;
(c) generating a next value E of said sine waves by calculating $E = ae + bf$, $F = cf - be$;
(d) replacing f by F and e by E;
(e) transmitting an electrical signal representing the values of E and of F to a user of said two sine wave signals;
(f) repeating steps (c), (d), and (e) every T seconds for the duration of the time of generation of said digital sine wave signals;
(g) calculating a normalizing factor $$N = 1.5 - \frac{(e^2 - 2ef\cos\phi + f^2)}{2(\sin\phi)^2};$$

(h) multiplying e and f by said normalizing factor; and
(j) repeating steps (g) and (h) every U seconds for the duration of the time of generation of said digital sine wave, where $U \geq T$.

19. The method of claim 18 wherein $U \geq 10T$.

20. The method of claim 18 wherein step (b) comprises the step of setting $e=0$ and setting f to one of $+A\sin\phi$ where A is the desired amplitude of said sine wave, further comprising the step of calculating $$m = \frac{1}{2(A\sin\phi)^2},$$

and wherein step (g) comprises the step of calculating $N = 1.5 - m(e^2 - 2ef\cos\phi + f^2)$.

21. The method of claim 20 wherein $U \geq 10T$.

22. A method of generating electrical digital signals representing periodic sample values for a frequency shift keyed sine wave the period of sample generation being T seconds, the frequencies of said sine wave being $F(1)$ and $F(2)$, $T < 1/2F(1)$ and $T < 1/2F(2)$, comprising the steps of:

(a) generating electrical signals representing the values of $c(i) = \sin 2\pi F(i)T$ and $d(i) = \cos 2\pi F(i)T$ where $i = 1,2$;
(b) generating electrical signal representing an initial value of the value of said sine wave, and an initial value f of the value of a cosine wave of the same phase, frequency and amplitude as said sine wave, for time $t=0$;
(c) selecting (i) according to which frequency is desired responsive to said frequency shift key signal;
(d) generating a next value E and F of said sine wave and said cosine wave by calculating $E = ed(i) + fc(i)$, $F = fd(i) - ec(i)$;
(e) replacing f by F, e by E;
(f) transmitting an electrical signal representing the value of E to a user of said signal;
(g) repeating steps (c), (d), (e) and (f) every T seconds for the duration of generation of said frequency shift keyed sine wave signals;
(h) calculating a normalizing factor N based on e and f;
(j) multiplying e and f by said normalizing factor; and
(k) repeating steps (h) and (j) every U seconds for the duration of time of generation of said digital frequency shift sine wave, where $U \geq T$.

23. The method of claim 22 wherein $U \geq 10T$.

24. The method of claim 22 wherein step (b) comprises the step of setting $e=0$, setting f to be one of $\pm A$, wherein a is the desired amplitude of said sine wave, further comprising the step of calculating $m = 1/2A^2$, and wherein step (h) comprises the step of calculating $N = 1.5 - m(e^2 + f^2)$.

25. The method of claim 24 wherein $U \geq 10T$.

26. A method of generating electrical digital signals representing periodic sample values of a phase shift keyed sine wave, responsive to a signal for shifting phases, said phase shift signal having the values 0, 1 and having an activity indicator for indicating a new phase shift signal, the period of sample generation being T seconds the frequency of said sine wave $F$, $T < 1/2F$, wherein $\omega = 2\pi FT$ comprising the steps of:

(a) generating electrical signals representing $c(i) = -\sin(\omega + ix)$, $d(i) = \cos(\omega + ix)$ where i has the value 0 and 1 and x represents the desired amount of phase shift corresponding to $i=1$;
(b) generating electrical signals representing an initial value e of the value of said sine wave, and the value of f for a cosine wave of the same phase, frequency and amplitude as said sine wave, for time $t=0$;
(c) generating the next values E of said sine wave and F of said cosine wave by calculating $E = eD(O) + fc(O)$, $F = fd(O) - e \, c(O)$ if said phase shift activity signal is not active, and calculating $E = ed(i) + fc(i)$, $F = fd(i) - ec(i)$ if said phase shift activity signal is active;
(d) replacing f with F and E with e;
(e) transmitting an electrical signal representing the value of E to a user of said signal;
(f) repeating steps (c), (d) and (e) every T seconds for the duration of the time of generation of said digital sine wave;
(g) calculating a normalizing factor N based on e and f;
(h) multiplying e and f by said normalizing factor; and
(j) repeating steps (g) and (h) every U seconds for the duration of the time of generation of said digital sine wave, where $U \geq T$.

27. The method of claim 26 wherein $U \geq 10T$.

28. The method of claim 26 wherein step (b) comprises the step of setting $e=0$ and $f=+A$ wherein A is the desired amplitude of said sine waves, further comprising the step of calculating $m=1/2A^2$, and wherein step (g) comprises the step of calculating $N=1.5-m(e^2+F^2)$.

29. The method of claim 28 wherein $U \geq 10T$.

30. A method of generating electrical digital signals representing periodic sample value for a sine wave, the period of sample generation being T seconds, the frequency of said sine wave being F, $T<1/2F$, wherein $\omega=2\pi FT$, comprising the steps of:
 (a) generating electrical signals representing the value of d, $d=2 \cos \omega$;
 (b) generating electrical signals representing an initial value e of the value of said sine wave for time $t=T$ and an intial value f of the value of the sine wave for time $t=0$;
 (c) generating a next value E of said sine wave by calculating $e=de-f$;
 (d) replacing f by e and e by E;
 (e) multiplying the value of E by a scaling factor S, to generate a scaled sample value;
 (f) transmitting an electrical signal representing said scaled sample value to a user of said signal;
 (g) repeating steps (c), (d), (e) and (f) every T seconds for the duration of time of generation of said digital sine wave;
 (h) calculating a normalizing factor N based on the values of d, e, and f;
 (j) multiplying e and f by said normalizing factor; and
 (k) repeating steps (h) and (j) every U seconds for the duration of the time of generation of said digital sine wave, where $U \geq T$.

31. The method of claim 30 wherein $U \geq 10T$.

32. The method of claim 30 wherein step (b) comprises the step of setting $e=0$ and setting f to one of $\pm(2^{-0.5})$ wherein step (h) comprises the step of calculating $N=1.5+def-e^2-f^2$.

33. The method of claim 32 wherein $U \geq 10T$.

34. The method of claim 30 in which step (a) comprises the steps of:
 storing the group of k initial values of $d(i)=2 \cos 2\pi F(i)T$ for k values of f(i), i representing an integer between 1 and k; and
 selecting d(a) in response to a request from the user for a sine wave of frequency F(a) where a is an integer between 1 and k.

* * * * *

UNITED STATES PATENT AND TRADEMARK OFFICE
CERTIFICATE OF CORRECTION

PATENT NO. : 4,761,751

DATED : August 2, 1988

INVENTOR(S) : Ronald J. Canniff

It is certified that error appears in the above-identified patent and that said Letters Patent is hereby corrected as shown below:

IN THE CLAIMS

Column 9, line 18, "$U \triangle 10T$" should be "$U \geq 10T$"

Column 9, line 22, "$2\omega F(i)T$) should be "$2\pi F(i)T$"

Column 9, line 35, after "value", second occurrence, insert --of the--

Column 9, line 38, "$E = De - f$" should be "$E = de - f$"

Column 10, line 5, before "wave" insert --sine--

Column 10, line 45, "valule" should be "value"

Column 10, line 67, "value of e" should be "value e of"

Column 11, line 6, "ZN" should be "N"

Column 11, line 9, "$U < 10T$" should be "$U > 10T$"

Column 11, line 14, after "of" insert --said--

Column 11, line 30, after "value f of the" insert --value of--

Column 12, line 5, "value of the value" should be "value e of the value"

UNITED STATES PATENT AND TRADEMARK OFFICE
CERTIFICATE OF CORRECTION

PATENT NO. : 4,761,751

DATED : August 2, 1988

INVENTOR(S) : Ronald J. Canniff

It is certified that error appears in the above-identified patent and that said Letters Patent is hereby corrected as shown below:

Column 12, lines 12 and 13, "E = ed(i) + f-c(i), F = fd(i) - ec(i)" should be
  "E = ed(i) + fc(i), F = fd(i) - ec(i)"

Column 12, line 29, "wherein a is the" should be "wherein A is the"

Column 12, line 30, "m = 1/2A2" should be "m = $1/2A^2$"

Column 12, lines 51 and 52, "E = e D(O) + f-c(O), F = fd(O) - e c(O)" should be
 "E = e d(0) + f c(0), F = f d(0) - e c(0)"

Column 12, line 56, "and E with e" should be "and e with E"

Column 13, line 2, "and f = +A" should be "and f = ±A"

Column 13, line 6, "N = 1.5 - m ($e^2$ + $F^2$)" should be
  "N = 1.5 - m ($e^2$ + $f^2$)"

Column 13, line 10, "value" should be "values"

UNITED STATES PATENT AND TRADEMARK OFFICE
CERTIFICATE OF CORRECTION

PATENT NO. : 4,761,751

DATED : August 2, 1988

INVENTOR(S) : Ronald J. Canniff

It is certified that error appears in the above-identified patent and that said Letters Patent is hereby corrected as shown below:

IN THE CLAIMS (cont'd)

Column 13, line 23, "e = de - f" should be "E = de - f"

Column 13, line 25, after "factor" insert a comma.

Signed and Sealed this

Twentieth Day of March, 1990

Attest:

JEFFREY M. SAMUELS

Attesting Officer

Acting Commissioner of Patents and Trademarks